United States Patent
Yoon et al.

(10) Patent No.: US 10,843,169 B2
(45) Date of Patent: *Nov. 24, 2020

(54) SUPER ABSORBENT POLYMER AND PREPARATION METHOD THEREOF

(71) Applicant: LG Chem, Ltd., Seoul (KR)

(72) Inventors: Ki Youl Yoon, Daejeon (KR); Hyo Sook Joo, Daejeon (KR); Gi Cheul Kim, Daejeon (KR); Hyeon Choi, Daejeon (KR); Ju Eun Kim, Daejeon (KR)

(73) Assignee: LG Chem, Ltd.

( * ) Notice: Subject to any disclaimer, the term of this patent is extended or adjusted under 35 U.S.C. 154(b) by 65 days.

This patent is subject to a terminal disclaimer.

(21) Appl. No.: 16/093,856

(22) PCT Filed: Jan. 31, 2018

(86) PCT No.: PCT/KR2018/001345
§ 371 (c)(1),
(2) Date: Oct. 15, 2018

(87) PCT Pub. No.: WO2018/159942
PCT Pub. Date: Sep. 7, 2018

(65) Prior Publication Data
US 2019/0126240 A1    May 2, 2019

(30) Foreign Application Priority Data

Mar. 2, 2017 (KR) .................. 10-2017-0027230

(51) Int. Cl.
*B01J 20/26* (2006.01)
*C08K 7/26* (2006.01)
*C08K 3/34* (2006.01)
*C08K 3/24* (2006.01)
*B01J 20/08* (2006.01)
*B01J 20/18* (2006.01)
*B01J 20/28* (2006.01)
*B01J 20/30* (2006.01)
*C08J 3/24* (2006.01)
*B01J 20/10* (2006.01)

(52) U.S. Cl.
CPC ............. *B01J 20/267* (2013.01); *B01J 20/08* (2013.01); *B01J 20/103* (2013.01); *B01J 20/18* (2013.01); *B01J 20/2808* (2013.01); *B01J 20/28061* (2013.01); *B01J 20/28064* (2013.01); *B01J 20/28066* (2013.01); *B01J 20/28083* (2013.01); *B01J 20/3021* (2013.01); *B01J 20/3085* (2013.01); *C08J 3/245* (2013.01); *C08K 3/34* (2013.01); *C08K 7/26* (2013.01); *C08J 2333/02* (2013.01)

(58) Field of Classification Search
CPC .. B01J 20/267; B01J 20/3085; B01J 20/3021; B01J 20/28083; B01J 20/2808; B01J 20/28066; B01J 20/28064; B01J 20/28061; B01J 20/18; B01J 20/103; B01J 20/08; C08J 3/245; C08J 2333/02; C08K 3/34; C08K 7/26

See application file for complete search history.

(56) References Cited

U.S. PATENT DOCUMENTS

| | | | |
|---|---|---|---|
| 6,277,772 B1 | 8/2001 | Gancet et al. | |
| 7,776,984 B2 | 8/2010 | Frank | |
| 2003/0157318 A1* | 8/2003 | Brehm | .................... C08K 7/26 |
| | | | 428/327 |
| 2017/0073478 A1 | 3/2017 | Joo et al. | |

FOREIGN PATENT DOCUMENTS

| | | |
|---|---|---|
| EP | 2557095 A1 | 2/2013 |
| JP | 2003507534 A | 2/2003 |
| JP | 2005194376 A | 7/2005 |
| JP | 2007284675 A | 11/2007 |
| JP | 2011213793 A | 10/2011 |
| JP | 6029800 B2 | 11/2016 |
| KR | 101507287 B1 | 3/2015 |
| KR | 20160016713 A | 2/2016 |
| KR | 20160016714 A | 2/2016 |
| KR | 101659173 B1 | 9/2016 |
| KR | 20170002470 A | 1/2017 |
| WO | 2005120594 A1 | 12/2005 |

(Continued)

OTHER PUBLICATIONS

Extended European Search Report including Written Opinion for Application No. EP18760375.8 dated May 21, 2019.
Akti F, Boran F. Preparation and Swelling Properties of Zeolite-Poly (2-hydroxyethyl methacrylate-co-acrylic acid) Hydrogel Composites. Acta Physica Polonica A. Jul. 1, 2016;130(1):147-9.
Chatterjee, Pronoy Kumar, Absorbency, vol. 7 of Textile Science and Technology, Elsevier Scientific Pub., Jun. 1, 1985, pp. 42-43.
Schwalm, R., "UV Coatings; Basics, Recent Developments and New Applications." Elsevier Science, Dec. 21, 2006, p. 115.
Odian, G..G., "Principles of Polymerization." Second Edition, John Wiley & Sons, Inc,, Copyright 1981, p. 203.
Chemical Engineering, vol. II, 3rd edition, J. M. Coulson and J. F. Richardson, Pergamon Press, 1978, pp. 125-127.

(Continued)

*Primary Examiner* — Andrew J. Oyer
(74) *Attorney, Agent, or Firm* — Lerner, David, Littenberg, Krumholz & Mentlik, LLP

(57) ABSTRACT

The present disclosure relates to a super absorbent polymer, including: a base resin powder comprising a first cross-linked polymer of a water soluble ethylene-based unsaturated monomer containing acidic groups which are at least partially neutralized; and a surface cross-linked layer comprising a second cross-linked polymer further cross-linked from the first cross-linked polymer and formed on the base resin powder, wherein the first cross-linked polymer is bound to a porous zeolite in which a mesopore having a BET surface area of at least 100 $m^2/g$ and a porosity of at least 0.2 $cm^3/g$ is formed, and a preparation method thereof.

20 Claims, No Drawings

(56) References Cited

FOREIGN PATENT DOCUMENTS

WO      2008018044 A2    2/2008
WO      2015163522 A1    10/2015

OTHER PUBLICATIONS

International Search Report for PCT/KR2018/001345 dated May 8, 2018.

* cited by examiner

SUPER ABSORBENT POLYMER AND PREPARATION METHOD THEREOF

CROSS-REFERENCE TO RELATED APPLICATIONS

The present application is a national phase entry under 35 U.S.C. § 371 of International Application No. PCT/KR2018/001345, filed on Jan. 31, 2018, which claims priority from Korean Patent Application No. 10-2017-0027230, filed on Mar. 2, 2017, the disclosures of which are incorporated herein by reference in their entirety.

TECHNICAL FIELD

The present disclosure relates to a super absorbent polymer which has more improved gel strength and is improved in both water retention capacity (centrifuge retention capacity, CRC) and absorption ability under pressure (AUP) due to an optimized cross-linked structure of the base resin powder inside the surface cross-linked layer, and a preparation method thereof.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, sanitary napkins, etc., but also for water retaining soil products for gardening, water stop materials for the civil engineering and construction, sheets for raising seedling, fresh-keeping agents for food distribution fields, materials for poultices, or the like.

In most cases, the super absorbent polymer is widely used in the field of hygiene products such as diapers and sanitary napkins, and, for this purpose, it is necessary to exhibit a high absorption capacity for moisture and the like. In addition, it is necessary that the absorbed moisture should not leak out even under external pressure. Further, it needs to show excellent permeability by maintaining its shape even in an expanded (swelled) state after absorbing water.

However, it has been known that it is difficult to improve both the water retention capacity (CRC) indicating basic absorption capacity and water retention ability of the super absorbent polymer, and the absorption ability under pressure (AUP) indicating the characteristic of holding the absorbed moisture even under external pressure together. This is because, when the overall cross-link density of the super absorbent polymer is controlled to be low, the CRC may relatively increase, but the AUP may decrease because the cross-linked structure becomes loose and the gel strength is reduced. On the other hand, when the cross-linking density is controlled to be high for improving the AUP, the basic CRC may decrease because moisture is hardly absorbed through the dense cross-linked structure.

For this reason, there has been a limit to provide a super absorbent polymer improved in both water retention capacity and the absorption ability under pressure. In order to solve this problem, there have been various attempts to improve these properties by controlling the type or amount of the internal cross-linking agent or the surface cross-linking agent. However, such attempts have reached the limited.

Therefore, there is a continuing need to develop a super absorbent polymer exhibiting improved water retention capacity and absorption ability under pressure together, and a technology capable of producing the same.

DETAILED DESCRIPTION OF THE INVENTION

Technical Problem

The present disclosure is to provide a super absorbent polymer which has more improved gel strength and is improved in both water retention capacity (centrifuge retention capacity, CRC) and absorption ability under pressure (AUP) due to an optimized cross-linked structure of the base resin powder inside the surface cross-linked layer.

In addition, the present disclosure is to provide a preparation method of the same.

Technical Solution

The present disclosure provides a super absorbent polymer, including:

a base resin powder comprising a first cross-linked polymer of a water soluble ethylene-based unsaturated monomer containing acidic groups which are at least partially neutralized; and a surface cross-linked layer comprising a second cross-linked polymer further cross-linked from the first cross-linked polymer and formed on the base resin powder, wherein the first cross-linked polymer is bound to a porous zeolite in which a mesopore having a BET surface area of at least 100 $m^2/g$ and a porosity of at least 0.2 $cm^3/g$ is formed.

The present disclosure also provides a method of preparing the super absorbent polymer, including the steps of:

preparing a monomer neutralized solution by adding an internal cross-linking agent and a porous zeolite containing a mesopore having a BET surface area of at least 100 $m^2/g$ and a porosity of at least 0.2 $cm^3/g$ to a neutralized solution in which at least 20 mol % of a water soluble ethylene-based unsaturated monomer containing acidic groups is neutralized, preparing a hydrogel polymer from the monomer neutralized solution by thermal polymerization or photopolymerization;

preparing a base resin powder by drying, pulverizing, and classifying the hydrogel polymer; and further cross-linking the surface of the base resin powder in the presence of a surface cross-linking agent to form a surface cross-linked layer.

Hereinafter, the super absorbent polymer and its preparation method according to the exemplary embodiments of the present disclosure will be described in more detail. However, the following is only for better understanding of the present invention, and the scope of the present invention is not limited thereby, and it is obvious to a person skilled in the related art that the embodiments can be variously modified within the scope of the present invention.

The term "include" or "have" means to include any elements (or components) without particular limitation unless there is a particular mention about them in this description, and it cannot be interpreted as having a meaning of excluding addition of other elements (or components).

In this disclosure, (meth) acrylate is meant to include both acrylate and methacrylate.

An embodiment of the present disclosure provides a super absorbent polymer, including:

a base resin powder comprising a first cross-linked polymer of a water soluble ethylene-based unsaturated monomer containing acidic groups which are at least partially neutralized; and a surface cross-linked layer comprising a second cross-linked polymer further cross-linked from the first cross-linked polymer and formed on the base resin powder, wherein the first cross-linked polymer is bound to a porous zeolite in which a mesopore having a BET surface area of at least 100 m$^2$/g and a porosity of at least 0.2 cm$^3$/g is formed.

As a result of experiments conducted by the present inventors, it has been found that when the super absorbent polymer was prepared by carrying out the polymerization using a porous zeolite in which a mesopore having a BET surface area of at least 100 m$^2$/g and a porosity of at least 0.2 cm$^3$/g is formed, the cross-linked structure of the inner part of the super absorbent polymer, for example, the base resin powder inside the surface cross-linked layer, was optimized, thereby preparing and providing a super absorbent polymer that both the water retention capacity and absorption ability under pressure are improved.

In the super absorbent polymer prepared as described above, for example, the polymer chains polymerized from the water soluble ethylene-based unsaturated monomer are cross-linked by a medium of the cross-linkable functional group of the internal cross-linking agent that has been previously used. In addition, the above-mentioned porous zeolite containing a mesopore having a BET surface area of at least 100 m$^2$/g and a porosity of at least 0.2 cm$^3$/g is uniformly dispersed in the first cross-linked polymer.

Accordingly, the super absorbent polymer of an embodiment, particularly, the base resin powder in the surface cross-linked layer has a cross-linked structure mediated by the internal cross-linking agent, and a structure that the porous zeolite containing a mesopore having a BET surface area of at least 100 m$^2$/g and a porosity of at least 0.2 cm$^3$/g is uniformly dispersed all over the first cross-linked polymer and the cross-linked structure. Therefore, the super absorbent polymer can realize a significantly improved level of the water retention capacity and absorption ability under pressure at the same time as compared with other previously known super absorbent polymers.

Due to this internal structure, the super absorbent polymer of an embodiment can basically exhibit high cross-linking density and relatively high gel strength, and thereby exhibiting excellent absorption ability under pressure. As a result, not only doesn't the absorbed water leak out under the external pressure, but also maintains its shape in an expanded (swelled) state after absorbing water, thereby exhibiting excellent permeability.

In the super absorbent polymer of an embodiment, the porous zeolite containing a mesopore having a BET surface area of at least 100 m$^2$/g and a porosity of at least 0.2 cm$^3$/g is uniformly dispersed over the first cross-linked polymer. Accordingly, in spite of the above-mentioned high cross-linking density and the like, a large amount of moisture can basically be absorbed and retained, and it is possible to exhibit the improved centrifuge retention capacity.

As described above, the first cross-linked polymer is bound to the porous zeolite in which a mesopore having a BET surface area of at least 100 m$^2$/g and a porosity of at least 0.2 cm$^3$/g is formed. More specifically, the mesopore formed in the porous zeolite may have a porosity of 0.2 cm$^3$/g to 0.8 cm$^3$/g and a BET surface area of 100 m$^2$/g to 250 m$^2$/g.

As the mesopore having a porosity of 0.2 cm$^3$/g to 0.8 Wig and a BET surface area of 100 m$^2$/g to 250 m$^2$/g is formed in the porous zeolite, the water soluble ethylene-based unsaturated monomer containing acidic groups which are at least partially neutralized can be diffused into the porous zeolite. Accordingly, the porous zeolite can serve as a cross-linking point in the cross-linking reaction.

When the porosity of the mesopore is out of the above range, for example, when the porosity is too large or small, the water soluble ethylene-based unsaturated monomer containing acidic groups which are at least partially neutralized is hardly diffused into the porous zeolite. Also, opacity of the neutralized solution or the reaction solution containing the water soluble ethylene-based unsaturated monomer may be excessively high.

In addition, when the BET surface area of the mesopore is out of the above range, for example, when the BET surface area is too large or small, the porous zeolite cannot serve as an inorganic filler or a support. And it may be hardly dispersed in the neutralized solution or the reaction solution containing the water soluble ethylene-based unsaturated monomer.

On the other hand, a total porosity of the porous zeolite may be 0.5 cm$^3$/g to 1.0 cm$^3$/g, and a BET surface area of entire pores formed in the porous zeolite may be 500 m$^2$/g to 1500 m$^2$/g.

Meanwhile, the porous zeolite may further contain a micropore having a BET surface area of 300 to 900 m$^2$/g and a porosity of 0.1 to 0.5 cm$^3$/g.

As is commonly known, pores having an average diameter of more than 0 and 2 nm or less are defined as micropores, and pores having an average diameter of more than 2 nm and 50 nm or less are defined as mesopores.

The porous zeolite may have a diameter of 100 nm to 500 nm, or 200 nm to 300 nm.

Hereinafter, the structure and preparation method of the super absorbent polymer of an embodiment will be described in more detail.

The super absorbent polymer of an embodiment basically includes a first cross-linked polymer of a water soluble ethylene-based unsaturated monomer as a base resin powder, and a surface cross-linked layer formed on the base resin powder, like conventional super absorbent polymers. The surface cross-linked layer includes a second cross-linked polymer, wherein the first cross-linked polymer is further cross-linked, for example, in the presence of a surface cross-linking agent.

In addition, the super absorbent polymer of the embodiment uses the above-mentioned porous zeolite together with the conventional internal cross-linking agent in the polymerization process for the preparation of the first cross-linked polymer and the base resin powder. Therefore, the first cross-linked polymer and the base resin powder have a cross-linked structure formed through an internal cross-linking agent, and the porous zeolite having the mesopore is uniformly dispersed in the first cross-linked polymer. Accordingly, in spite of the above-mentioned high cross-linking density and the like, a large amount of moisture can basically be absorbed and retained, and it is possible to exhibit the improved water retention capacity.

In the super absorbent polymer of the embodiment, the soluble ethylene-based unsaturated monomer may include at least one selected from the group consisting of anionic monomer such as acrylic acid, methacrylic acid, maleic anhydride, fumalic acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and a salt thereof; a nonionic hydrophilic monomer such as (meth)acrylamide, N-substituted (meth)acrylate, 2-hydroxyethyl (meth)acrylate, 2-hydroxypropyl(meth)acrylate, methoxypolyethyleneglycol(meth)acrylate, or polyethyleneglycol (meth)acrylate; and an amino-containing unsaturated monomer such as (N,N)-dimethylaminoethyl(meth)acrylate or (N,N)-dimethylaminopropyl(meth)acrylamid, and a quaternary compound thereof.

Among these, acrylic acid or salts thereof, for example, acrylic acid and/or alkali metal salts thereof such as sodium salts in which at least a part of acrylic acid is neutralized, may be used. By using the monomer, it becomes possible to prepare a super absorbent polymer having superior physical properties. When the alkali metal salt of acrylic acid is used as the monomer, it is possible to use acrylic acid after neutralizing the same with a basic compound such as sodium hydroxide (NaOH).

In addition, as the internal cross-linking agent to introduce a basic cross-linked structure into the first cross-linked polymer and the base resin powder, any internal cross-linking agent having a cross-linkable functional group which has been generally used in the preparation of the super absorbent polymer may be used without limitation.

However, to further improve physical properties of the super absorbent polymer by introducing a proper cross-linked structure into the first cross-linked polymer and the base resin powder, a polyfunctional acrylate-based compound containing a plurality of ethylene oxide groups may be used as the internal cross-linking agent.

More specific examples of the internal cross-linking agent may include at least one selected from the group consisting of polyethylene glycol diacrylate (PEGDA), glycerine diacrylate, glycerine triacrylate, unmodified or ethoxylated trimethylol triacrylate (TMPTA), hexanediol diacrylate, and triethylene glycol diacrylate.

The super absorbent polymer may further include an inorganic particle chemically bonded to the first cross-linked polymer by a medium of a cross-linking bond, an oxygen-containing bond (—O—), or a nitrogen-containing bond (—NR—, where R is hydrogen or a C1-C3 alkyl or amide bond).

Since the inorganic particle of which the surface is modified with a cross-linkable or hydrophilic functional group disclosed above is used, the inorganic particle is chemically bonded (for example, a covalent bond, a cross-linking bond, and the like) to the polymer chains of the first cross-linked polymer by a medium of a cross-linking bond derived from the functional group (for example, a cross-linking bond derived from a (meth)acrylate-based functional group or a cross-linkable functional group of allyl group or vinyl group), or an oxygen- or nitrogen-containing bond (for example, an ether bond, an amine bond, or an amine bond derived from a hydrophilic functional group of an epoxy group, a hydroxy group, an isocyanate group, or an amine group). By this, the first cross-linked polymer and the base resin powder have the double cross-linked structure that is formed by a medium of the internal cross-linking agent and the surface-modified inorganic particle, and thus the super absorbent polymer can exhibit excellent overall properties disclosed above (particularly, both the improved water retention capacity and absorption ability under pressure).

Also, a silica nanoparticle or an alumina nanoparticle that is surface-modified with the hydrophilic or cross-linkable functional group may be used as the inorganic particle.

The inorganic particle may be surface-modified with a cross-linkable or hydrophilic functional group including at least one functional group selected from the group consisting of a (meth)acrylate-based functional group, an allyl group, a vinyl group, an epoxy group, a hydroxy group, an isocyanate group, and an amine group, and specifically, the inorganic particle may be a silica nanoparticle or a alumina nanoparticle of which the surface is modified with a cross-linkable or hydrophilic functional group including at least one functional group selected from the group consisting of a (meth)acrylate-based functional group, an allyl group, a vinyl group, an epoxy group, a hydroxy group, an isocyanate group, and an amine group.

The cross-linkable or hydrophilic functional group may include at least one functional group selected from the group consisting of a (meth)acrylate-based functional group, an allyl group, a vinyl group, an epoxy group, a hydroxy group, an isocyanate group, and an amine group. Specifically, the cross-linkable or hydrophilic functional group may be a C2-C20 substituent including at least one functional group selected from the group consisting of a (meth)acrylate-based functional group, an allyl group, a vinyl group, an epoxy group, a hydroxy group, an isocyanate group, and an amine group at the end.

As described above, the inorganic particle can be chemically bonded to the first cross-linked polymer by a medium of a cross-linking bond, an oxygen-containing bond (—O—), or a nitrogen-containing bond, wherein the cross-linking bond, the oxygen-containing bond (—O—), or the nitrogen-containing bond may be formed through the reaction between the first cross-linked polymer and the inorganic particle of which the surface is modified with the cross-linkable or hydrophilic functional group.

As an example of the inorganic particle of which the surface is modified with the cross-linkable or hydrophilic functional group, the inorganic particle of which the compound of Chemical Formula 1 is bonded to the surface may be used.

[Chemical Formula 1]

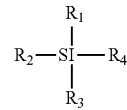

In Chemical Formula 1, $R_1$ to $R_3$ are independently a C1 to C10 alkyl group, a C1 to C10 alkoxy group, or a halogen, and at least one of them is not an alkyl group, $R_4$ is a C2 to C20 aliphatic functional group including at least one functional group selected from the group consisting of a (meth)acrylate-based functional group, an allyl group, a vinyl group, an epoxy group, a hydroxy group, an isocyanate group, and an amine group at the end, or a C2 to C20 hetero-aliphatic functional group of which at least one carbon is substituted with oxygen or nitrogen, including at least one functional group selected from the group consisting of a (meth)acrylate-based functional group, an allyl group, a vinyl group, an epoxy group, a hydroxy group, an isocyanate group, and an amine group at the end.

The aliphatic functional group means a functional group derived from an aliphatic hydrocarbon, for example, an alkane, an alkene, or an alkyne. Furthermore, the hetero-aliphatic functional group means an aliphatic functional group of which at least one carbon is substituted with a heteroatom, for example, oxygen or nitrogen.

The compound of Chemical Formula 1 may be bonded to the surface of the inorganic particle through a siloxane bond, and specifically, at least one of $R_1$ to $R_3$ is substituted with a hydroxyl group or an oxygen-containing group of the surface of the silica particle or the alumina particle so as to form the siloxane bond including the silicon particle of Chemical Formula 1.

The inorganic particle of which the surface is modified with the cross-linkable or hydrophilic functional group is preferably an inorganic particle of which the surface is modified with about 2 to 4000, about 5 to 3000, or about 10 to 2000 cross-linkable or hydrophilic functional groups per particle. Considering a proper number of the cross-linkable or hydrophilic functional groups to be introduced per surface-modified inorganic particle, the surface-modified inorganic particle may be prepared by reacting the inorganic particle and the surface-modifying agent having the cross-linkable or hydrophilic functional group with a proper content ratio.

The number of cross-linkable or hydrophilic functional groups introduced to one surface-modified inorganic particle may be changed according to a specific functional group. For example, when the cross-linkable or hydrophilic functional group introduced to the surface of the inorganic particle is the cross-linkable or hydrophilic functional group including at least one functional group selected from the group consisting of a (meth)acrylate-based functional group, an allyl group, and a vinyl group, 2 to 500 functional groups may be introduced to the surface of one inorganic particle.

The cross-linkable or hydrophilic functional group including at least one functional group selected from the group consisting of a (meth)acrylate-based functional group, an allyl group, and a vinyl group may act as a kind of cross-linking agent, that is, if 2 or more cross-linkable or hydrophilic functional groups are bonded to the surface of one inorganic particle, it may act as a cross-linking agent. However, when the cross-linkable or hydrophilic functional groups including at least one functional group selected from the group consisting of a (meth)acrylate-based functional group, an allyl group, and a vinyl group exist excessively, the surface of the modified inorganic particle may become hydrophobic, and accordingly, the transparency of the neutralization solution including the surface-modified inorganic particle may decrease, and it becomes difficult for UV rays to penetrate and the polymerization may not occur properly when UV polymerization is carried out.

Furthermore, when the cross-linkable or hydrophilic functional group including at least one functional group selected from the group consisting of an epoxy group, a hydroxy group, an isocyanate group, and an amine group is introduced to the surface of the inorganic particle, 2 to 2000 functional groups may be bonded to the surface of one inorganic particle. As the cross-linkable or hydrophilic functional group including at least one functional group selected from the group consisting of an epoxy group, a hydroxy group, an isocyanate group, and an amine group is bonded to the surface of the modified inorganic particle, the neutralization solution including the surface-modified inorganic particle may have higher dispersion stability and transparency, and the phenomenon that the surface-modified inorganic particles cohere in the neutralization solution may be prevented.

In more specific examples, a silica nanoparticle such as fumed silica or colloidal silica may be representatively used as the surface-modified inorganic particle. Furthermore, the amount of the cross-linkable or hydrophilic functional group per unit area of the surface-modified inorganic particle may be 0.004 $\mu$mol/m$^2$ or more.

In the case of the fumed silica, the inorganic particle and the surface modifying agent may be reacted so that the amount of the cross-linkable or hydrophilic functional group per surface area of 1 m$^2$ of the silica nanoparticle becomes about 0.004 $\mu$mol/m$^2$ or more, about 0.04 $\mu$mol/m$^2$ or more, about 1.0 $\mu$mol/m$^2$ or more, or about 0.04 to 4 $\mu$mol/m$^2$.

In the case of the colloidal silica, the inorganic particle and the surface modifying agent may be reacted so that the amount of the cross-linkable or hydrophilic functional group per surface area of 1 m$^2$ of the silica nanoparticle becomes about 0.004 $\mu$mol/m$^2$ or more, about 0.07 $\mu$mol/m$^2$ or more, about 1.0 $\mu$mol/m$^2$ or more, or about 0.07 to 7 $\mu$mol/m$^2$.

The amount of the cross-linkable or hydrophilic functional group per unit area of the surface-modified inorganic particle may be changed according to a specific functional group.

For example, the amount of the cross-linkable or hydrophilic functional groups including at least one functional group selected from the group consisting of a (meth)acrylate-based functional group, an allyl group, and a vinyl group per unit area of the surface-modified inorganic particle may be 0.004 to 0.8 $\mu$mol/m$^2$.

In addition, the inorganic particle may be bonded in an amount of about 0.01 to 30 parts by weight based on 100 parts by weight of the base resin powder. In this way, the double cross-linked structure is optimally introduced to the base resin powder and the first cross-linked polymer, and thus the super absorbent polymer of one embodiment can have more improved properties, for example, the water retention capacity and the absorption ability under pressure.

Furthermore, in the super absorbent polymer of one embodiment, any surface cross-linking agent that has been used for preparing a super absorbent polymer can be used as the surface cross-linking agent for forming the surface cross-linked layer formed on the base resin powder and the second cross-linked polymer included therein, without limitation.

For more specific examples, at least one selected from the group consisting of ethylene glycol, 1,4-butanediol, 1,6-hexanediol, propylene glycol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, glycerol, ethylene carbonate and propylene carbonate may be used.

And, the super absorbent polymer of one embodiment may exhibit characteristics that the centrifuge retention capacity (CRC) to a saline solution is about 20 to 40 g/g, the absorption ability under pressure (AUP) at 0.7 psi to a saline solution is about 15 to 35 g/g, and the gel strength is about 4000 to 20000 Pa.

Meanwhile, the centrifuge retention capacity (CRC) to a saline solution may be measured according to EDANA method WSP 241.2. More specifically, the centrifuge retention capacity can be calculated by the following Calculation Equation 1, after making the super absorbent polymer absorb the saline solution for 30 min:

$$CRC(g/g) = \{[W_2(g) - W_1(g)]/W_0(g)\} - 1 \qquad \text{[Calculation Equation 1]}$$

In Calculation Equation 1, $W_0(g)$ is an initial weight (g) of the super absorbent polymer, $W_1(g)$ is a weight of the apparatus measured after dehydrating the same by using a centrifuge at 250 G for 3 min without using the super absorbent polymer, and $W_2(g)$ is a weight of the apparatus with the superabsorbent polymer measured after soaking the super absorbent polymer in a 0.9 wt % saline solution for 30 min at room temperature and dehydrating the same by using a centrifuge at 250 G for 3 min.

Furthermore, the absorption ability under pressure (AUP) at 0.7 psi may be measured according to EDANA method WSP 242.2. More specifically, the absorption ability under pressure can be calculated by the following Calculation Equation 2, after making the super absorbent polymer absorb the saline solution for 1 h under the pressure of about 0.7 psi:

$$AUP(g/g)=[W_4(g)-W_3(g)]/W_0(g) \qquad \text{[Calculation Equation 2]}$$

In Calculation Equation 2, $W_0(g)$ is an initial weight (g) of the super absorbent polymer, $W_3(g)$ is a sum of a weight of the super absorbent polymer and a weight of the apparatus providing load to the polymer, and $W_4(g)$ is a sum of a weight of the super absorbent polymer and a weight of the apparatus providing load to the polymer measured after making the super absorbent polymer absorb the saline solution for 1 h under the pressure (0.7 psi).

$W_0(g)$ in Calculation Equations 1 and 2 corresponds to the initial weight of the super absorbent polymer before the super absorbent polymer absorbs the saline solution, and it may be the same or different in each equations.

Further, the horizontal direction gel strength G' may be measured according to the following method disclosed in Korea Patent Application No. 2014-01653514.

More specifically, after making the super absorbent polymer absorb the saline solution for 1 h, the horizontal direction gel strength G' may be measured according to the method including the following steps, by using a commercial rheometer:

1) The step of making the super absorbent polymer absorb the saline solution and swell; 2) the step of positioning the swelled super absorbent polymer between the plates of the rheometer having a certain gap, and pressing both sides of the plates; 3) the step of checking the shear strain in the linear viscoelastic regime section where the storage modulus and the loss modulus are constant, while increasing the shear strain by using the rheometer under vibration; and 4) the step of measuring the storage modulus and the loss modulus of the swelled super absorbent polymer under the checked shear strain, and determining the average value of the storage modulus as the gel strength.

More specific measuring conditions and method of the horizontal direction gel strength G' are disclosed in Examples below.

In addition, in the super absorbent polymer of one embodiment, the permeability (SFC) to the saline solution under the pressure of about 0.3 psi may be about 10×10−7 cm$^3$*sec/g or more. The permeability may be measured according to a method using Darcy's law and a constant flow method (for example, "Absorbency", edited by P. K. Chatterjee, Elsevier 1985, pp. 42-43 and Chemical Engineering, Vol. II, 3rd edition, J. M. Coulson and J. F. Richarson, Pergamon Press, 1978, pp. 125-127).

And, the super absorbent polymer of one embodiment may have a particle shape of spherical or amorphous having a diameter of about 150 to 850 μm.

Another embodiment of the present disclosure provides a method of preparing the super absorbent polymer, including the steps of:

preparing a monomer neutralized solution by adding an internal cross-linking agent and a porous zeolite containing a mesopore having a BET surface area of at least 100 m$^2$/g and a porosity of at least 0.2 cm$^3$/g to a neutralized solution in which at least 20 mol % of a water soluble ethylene-based unsaturated monomer containing acidic groups is neutralized, preparing a hydrogel polymer from the monomer neutralized solution by thermal polymerization or photopolymerization;

preparing a base resin powder by drying, pulverizing, and classifying the hydrogel polymer; and further cross-linking the surface of the base resin powder in the presence of a surface cross-linking agent to form a surface cross-linked layer.

In the preparation method of the embodiment, a super absorbent polymer may be prepared by adding an internal cross-linking agent and a porous zeolite containing a mesopore having a BET surface area of at least 100 m$^2$/g and a porosity of at least 0.2 cm$^3$/g to a neutralized solution in which at least 20 mol % of a water soluble ethylene-based unsaturated monomer containing acidic groups is neutralized, and polymerizing, followed by drying, pulverizing, classifying and surface cross-linking according to a general preparation method of a super absorbent polymer.

Accordingly, the super absorbent polymer prepared as above, particularly, the base resin powder in the surface cross-linked layer has a cross-linked structure mediated by the internal cross-linking agent, and a structure that the porous zeolite containing a mesopore having a BET surface area of at least 100 m$^2$/g and a porosity of at least 0.2 cm$^3$/g is uniformly dispersed all over the first cross-linked polymer and the cross-linked structure. Accordingly, the super absorbent polymer can realize a significantly improved level of the water retention capacity and absorption ability under pressure at the same time as compared with other previously known super absorbent polymers.

In order to uniformly disperse the porous zeolite containing a mesopore having a BET surface area of at least 100 m$^2$/g and a porosity of at least 0.2 cm$^3$/g over the first cross-linked polymer and the cross-linked structure, the water soluble ethylene-based unsaturated monomer should be at least 20 mol %, 20 mol % to 60 mol %, or 30 mol % to 50 mol % neutralized.

As the water soluble ethylene-based unsaturated monomer containing acidic groups is partially neutralized within the above range, it is possible to form a more rigid internal cross-linked structure in the base resin powder, and the porous zeolite can be dispersed throughout the first cross-linked polymer and the cross-linked structure.

Accordingly, the preparation method of the super absorbent polymer may further include a step of adding a basic compound to the water soluble ethylene-based unsaturated monomer containing acidic groups to form a neutralized solution which is at least 20 mol % neutralized.

The neutralization degree of the water soluble ethylene-based unsaturated monomer containing acidic groups can be calculated and confirmed from a molar ratio of the acidic groups of the water soluble ethylene-based unsaturated monomer containing acidic groups to the hydroxyl groups of the basic compound.

Acrylic acid may be mainly used as the water soluble ethylene-based unsaturated monomer containing acidic groups, and an alkali metal salt thereof may be used together. In this case, acrylic acid may be partially neutralized with a basic compound such as sodium hydroxide (NaOH), and then used.

As described above, the first cross-linked polymer contained in the super absorbent polymer is bound to the porous zeolite in which a mesopore having a BET surface area of at least 100 m²/g and a porosity of at least 0.2 cm³/g is formed. More specifically, the mesopore formed in the porous zeolite may have a porosity of 0.2 cm³/g to 0.8 cm³/g and a BET surface area of 100 m²/g to 250 m²/g.

As the mesopore having a porosity of 0.2 cm³/g to 0.8 cm³/g and a BET surface area of 100 m²/g to 250 m²/g is formed in the porous zeolite, the water soluble ethylene-based unsaturated monomer containing acidic groups which are at least partially neutralized can be diffused into the porous zeolite. Accordingly, the porous zeolite can serve as a cross-linking point in the cross-linking reaction.

When the porosity of the mesopore is out of the above range, for example, when the porosity is too large or small, the water soluble ethylene-based unsaturated monomer containing acidic groups which are at least partially neutralized is hardly diffused into the porous zeolite. Also, opacity of the neutralized solution or the reaction solution containing the water-soluble ethylene-based unsaturated monomer may be excessively high.

In addition, when the BET surface area of the mesopore is out of the above range, for example, when the BET surface area is too large or small, the porous zeolite cannot serve as an inorganic filler or a support. And it may be hardly dispersed in the neutralized solution or the reaction solution containing the water-soluble ethylene-based unsaturated monomer.

On the other hand, a total porosity of the porous zeolite may be 0.5 cm³/g to 1.0 cm²/g, and a BET surface area of entire pores formed in the porous zeolite may be 500 m²/g to 1500 m²/g.

Meanwhile, the porous zeolite may further contain a micropore having a BET surface area of 300 to 900 m²/g and a porosity of 0.1 to 0.5 cm³/g.

The porous zeolite may have a diameter of 100 nm to 500 nm, or 200 nm to 300 nm.

Hereinafter, the surface-modified inorganic particle and the preparation method thereof will be first concretely explained, and the preparation method of the super absorbent polymer using the same will be briefly explained step by step, because the preparation method of the embodiment may follow a common preparation method of a super absorbent polymer except that an internal cross-linking agent and a porous zeolite containing a mesopore having a BET surface area of at least 100 m²/g and a porosity of at least 0.2 cm³/g is added to a neutralized solution in which at least 20 mol % of a water soluble ethylene-based unsaturated monomer containing acidic groups is neutralized.

In the preparation method of the super absorbent polymer of another embodiment, the hydrogel polymer may be formed by carrying out the cross-linking polymerization of the water soluble ethylene-based unsaturated monomer containing acidic groups which are at least partially neutralized, in the presence of the internal cross-linking agent and the surface-modified inorganic particle disclosed above.

Additional explanations regarding the surface-modified inorganic particle, the internal cross-linking agent, and the kind and structure of the water soluble ethylene-based unsaturated monomer are omitted here because they are the same as described above.

Further, the amount of the water soluble ethylene-based unsaturated monomer in the monomer neutralized solution may be about 20 to about 60 wt %, or about 40 to 50 wt %, and a proper concentration may be selected by considering polymerization time and reaction conditions. However, when the concentration of the monomer is excessively low, there may be a problem in economy because the yield of the super absorbent polymer becomes low, and contrarily, when the concentration is excessively high, there may be a problem in the process in that part of the monomer is extracted or the pulverizing efficiency becomes low in the pulverization process of the polymerized hydrogel polymer, and the properties of the super absorbent polymer may decrease.

In addition, the monomer neutralized solution may further include a thermal polymerization initiator or a photopolymerization initiator, and the monomer composition may further include a polymerization initiator that has been generally used for preparing a super absorbent polymer.

Specifically, the polymerization initiator may be an initiator for thermal polymerization or an initiator for photopolymerization by UV radiation according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

Here, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial Lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, and the present invention is not limited thereto.

The concentration of the photopolymerization initiator in the monomer composition may be about 0.01 to about 1.0 wt %. When the concentration of the photopolymerization initiator is excessively low, the polymerization rate becomes slow, and when the concentration of the photopolymerization initiator is excessively high, the molecular weight of the super absorbent polymer becomes low and the properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate (K2S2O8), ammonium persulfate ($(NH_4)_2S_2O_8$), and the like may be used as examples of the persulfate-based initiators; and 2,2-azobis-(2-amidinopropane)dihydrochloride, 2,2-azobis-(N,N-dimethylene)isobutyramidinedihydrochloride, 2-(carbamoylazo)isobutylonitril, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present invention is not limited thereto.

The concentration of the thermal polymerization initiator included in the monomer composition may be about 0.001 to about 0.5 wt %. When the concentration of the thermal polymerization initiator is excessively low, additional thermal polymerization hardly occurs and there may be less effect according to the addition of the thermal polymerization initiator, and when the concentration of the thermal polymerization initiator is excessively high, the molecular weight of the super absorbent polymer becomes low and the properties may be uneven.

The kind of the internal cross-linking agent included together in the monomer composition is the same as above, and the internal cross-linking agent may be included in the monomer composition with the concentration of about 0.01 to about 0.5 wt % and cross-link the prepared polymer. Particularly, the super absorbent polymer satisfying the properties of one embodiment disclosed above can more properly be obtained by using about 0.3 parts by weight or more, or about 0.3 to 0.6 parts by weight, of the internal cross-linking agent, based on 100 parts by weight of the monomer, for example, non-neutralized acrylic acid.

Furthermore, the monomer composition may further include an additive such as a thickener, a plasticizer, a preservation stabilizer, an antioxidant, and the like, if necessary.

The raw materials such as the water soluble ethylene-based unsaturated monomer, the surface-modified inorganic particle, the photopolymerization initiator, the thermal polymerization initiator, the internal cross-linking agent, and the additive may be prepared in the form of a monomer composition solution dissolved in a solvent.

At this time, any solvent which can dissolve the components may be used without limitation, and for example, one or more solvents selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, and the like may be used solely or in combination.

The solvent may be included in the monomer composition at a residual quantity except for the above components.

Meanwhile, the method of preparing the hydrogel polymer by thermal polymerization or photopolymerization of the monomer composition is not particularly limited if it is a common polymerization method.

Specifically, the polymerization method is largely divided into the thermal polymerization and the photopolymerization according to the energy source of the polymerization. In the case of thermal polymerization, it is generally carried out in a reactor having a kneading spindle, such as a kneader. In the case of photopolymerization, it may be carried out in a reactor equipped with a movable conveyor belt. However, the polymerization method is just an example, and the present invention is not limited thereto.

For example, as described above, the hydrogel polymer obtained by carrying out the thermal polymerization by providing hot air to a reactor equipped with a kneading spindle such as a kneader or heating the reactor is discharged from the outlet of the reactor and may have a size of centimeters or millimeters, according to the shape of the kneading spindle installed in the reactor. Specifically, the size of the obtained hydrogel polymer may vary according to the concentration and the feeding speed of the monomer composition, and generally the obtained hydrogel polymer may have a weight average diameter of about 2 to about 50 mm.

Furthermore, in the case of carrying out the photopolymerization in a reactor equipped with a movable conveyor belt, the hydrogel polymer may be obtained in the form of a sheet having a width corresponding to a width of the belt.

At this time, the thickness of the polymer sheet may vary according to the concentration and the feeding speed of the monomer composition, but it is preferable to feed the monomer composition so that a polymer sheet having a thickness of about 0.5 to about 5 cm can be obtained. It is undesirable to feed the monomer composition so that the thickness of the polymer sheet becomes excessively thin, because it makes the production efficiency low, and if the thickness of the obtained polymer sheet is over 5 cm, the polymerization reaction cannot evenly occur across the thickness because of its excessively thick thickness.

Generally, the moisture content of the hydrogel polymer obtained by the above method may be about 40 to about 80 wt %. At this time, "moisture content" in the present description is the content of moisture in the entire weight of the hydrogel polymer, and it means a value of which the weight of the dried polymer is subtracted from the weight of the hydrogel polymer. Specifically, the moisture content is defined as a value calculated from the weight loss due to moisture evaporation from the polymer in the process of increasing the temperature of the polymer and drying the same through infrared heating. At this time, the drying condition for measuring the moisture content is that the temperature is increased to about 180° C. and maintained at 180° C., and the total drying time is 20 min including 5 min of a heating step.

Further, after the cross-linking polymerization of the monomer, the base resin powder may be obtained by the processes of drying, pulverization, classification, and the like. Here, it is preferable that the base resin powder and the super absorbent polymer obtained therefrom are prepared and provided so as to have a diameter of about 150 to 850 μm, through the processes of pulverization and classification. More specifically, at least about 95 wt % of the base resin powder and the super absorbent polymer obtained therefrom have a diameter of about 150 to 850 μm, and the fine powder having a diameter less than about 150 μm may be less than about 3 wt %.

Since the particle size distributions of the base resin powder and the super absorbent polymer are controlled in a preferable range, the final super absorbent polymer prepared can exhibit the properties disclosed above as well as excellent permeability.

The processes of drying, pulverization, and classification will be described in more detail as follows.

First, in drying the hydrogel polymer, a coarse pulverizing step may be further included before the drying step for increasing the drying efficiency, if necessary.

Here, the pulverizing machine used is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

In the coarse pulverizing step, the hydrogel polymer may be crushed to have a diameter of about 2 to about 10 mm.

It is technically difficult to pulverize the hydrogel polymer to have a diameter of less than 2 mm because of its high moisture content, and there may be a phenomenon that the crushed particles cohere with each other. Meanwhile, when the polymer is crushed to have a diameter of larger than 10 mm, the efficiency enhancing effect in the subsequent drying step may be low.

The hydrogel polymer coarsely pulverized as above or the hydrogel polymer immediately after the polymerization without the coarse pulverizing step is subjected to drying. At this time, the drying temperature of the drying step may be about 150 to about 250° C. When the drying temperature is lower than about 150° C., the drying time may become excessively long and the properties of the super absorbent polymer finally prepared may decrease. And when the drying temperature is higher than about 250° C., the surface of the polymer is excessively dried, and fine powders may be generated in the subsequent pulverization process and the properties of the super absorbent polymer finally prepared may decrease. Therefore, the drying process may be preferably carried out at a temperature of about 150 to about 200° C., more preferably at a temperature of about 160 to about 180° C.

Furthermore, the drying time may be about 20 to about 90 min in consideration of process efficiency, but it is not limited thereto.

The drying method in the drying step is not particularly limited if it has been generally used in the drying process of the hydrogel polymer. Specifically, the drying step may be carried out by the method of hot air provision, infrared radiation, microwave radiation, UV ray radiation, and the like. The moisture content of the polymer after the drying step may be about 0.1 to about 10 wt %.

Subsequently, the step of pulverizing the dried polymer obtained from the drying step is carried out.

The polymer powder obtained after the pulverization step may have a diameter of about 150 to about 850 μm. In order to pulverize the polymer into such diameter, a pin mill, a hammer mill, a screw mill, a roll mill, a disc mill, or a jog mill may be used as the pulverizer, but it is not limited thereto.

Further, in order to maintain the properties of the super absorbent polymer powder which is finally commercialized after the pulverization step, a separate process of classifying the polymer powders obtained after the pulverization according to the particle size may be carried out. Preferably, after classifying the polymer having a diameter of about 150 to about 850 μm, only the polymer powder may be subjected to the surface cross-linking reaction and finally commercialized. Since details regarding the particle size distribution of the base resin powder obtained by this process are already explained above, more detailed explanation thereof will be omitted here.

After preparing the base resin powder, the surface cross-linked layer may be formed by further cross-linking the surface of the base resin powder in the presence of the surface cross-linking agent, and the super absorbent polymer may be thereby prepared. A more detailed explanation thereof is omitted here, because details regarding the surface cross-linking agent are already explained above.

In the surface cross-linking process, the surface cross-linked structure of the super absorbent polymer may be more optimized by carrying out the surface cross-linking after adding a multivalent metal cation in company with the surface cross-linking agent. This may be because the metal cation forms a chelate with a carboxyl group (COOH) of the super absorbent polymer, and further reduces the cross-linking distance.

The method of adding the surface cross-linking agent to the base resin powder is not particularly limited. For example, a method of adding and mixing the surface cross-linking agent and the base resin powder in a reactor, a method of spraying the surface cross-linking agent on the base resin powder, and a method of mixing the base resin powder and the surface cross-linking agent while continuously providing them to a continuously operating mixer may be used.

When the surface cross-linking agent is added thereto, water and methanol may be further mixed therewith. When water and methanol are added thereto, there is an advantage that the surface cross-linking agent can be evenly dispersed in the base resin powder. At this time, the amount of water and methanol per 100 parts by weight of the base resin powder may be controlled for the purposes of inducing a uniform dispersion of the surface cross-linking agent, preventing an agglomeration phenomenon, and optimizing the surface penetration depth of the cross-linking agent.

The surface cross-linking reaction may be carried out by heating the base resin powder to which the surface cross-linking agent is applied at about 160° C. or more for 20 min. Particularly, in order to obtain the super absorbent polymer satisfying the properties according to one embodiment properly, the surface cross-linking process may be carried out under the condition that the maximum reaction temperature is about 180 to 200° C. and the maximum reaction temperature is maintained for about 20 min or more, or for about 20 min to 1 hour. Furthermore, the heat-up time from the initiation temperature, for example, about 160° C. or more, or about 160 to 170° C., to the maximum reaction temperature may be controlled to be about 10 min or more, or about 10 min to 1 hour. And it is recognized that the super absorbent polymer satisfying the properties according to one embodiment properly can be prepared by satisfying the above surface cross-linking process condition.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present invention is not limited thereto.

The super absorbent polymer obtained by the above preparation method can show excellent properties in which various properties such as water retention capacity and absorption ability under pressure are improved together, and it can be adequately applied to various sanitary products such as a diaper and can show excellent overall properties.

As described above, the super absorbent polymer may further include an inorganic particle chemically bonded to the first cross-linked polymer by a medium of a cross-linking bond, an oxygen-containing bond (—O—), or a nitrogen-containing bond (—NR—, where R is hydrogen or a C1-C3 alkyl or amide bond).

The surface-modified inorganic particle may be prepared by reacting the surface-modifying agent having the cross-linkable or hydrophilic functional group at the end and the inorganic particle such as a silica nanoparticle or an alumina nanoparticle. At this time, any compound having the cross-linkable or hydrophilic functional group disclosed above at the end may be used as the surface modifying agent without limitation.

As an example of the surface modifying agent, at least one compound selected from the group consisting of 4-aminobutyltriethoxysilane, 4-aminoo-3,3-dimethylbutylmethyldimethoxylsilane, 4-amino-3,3-dimethylbutyltrimethoxysilane, N-(2-aminothhyl)-3-aminopropylmethyldimethoxysilane, N-(2-aminoethyl)-3-aminoproylsilanetriol, N-(2-aminoethyl)-3-aminopropyltriethoxysilane, N-(2-aminoethyl)-3-aminopropyltriethoxysilane, N-(2-aminoethyl)-11- aminoundecyltriethoxysilane, N-(2-aminohexyl)aminomethyltriethoxysilane, 3-(maminophenoxy)propyltriethoxysilane, m-aminophenyltriethoxysilane, paminophenyltriethoxysilane, 3-aminopropylmethyldiethoxysilane, 3-aminopropylethoxysilane, 3-aminopropyletrimethoxysilane, 2-cyanoethyltriethoxysilane, 2-(3,4-epoxycyclohexyl)ethyltriethoxysilane, 2-(3,4-epoxycyclohexyl)ethyltrimethoxysilane, 5,6-epoxyhexyltriethoxysilane, (3-glycidoxypropyl)methyldiethoxysilane, (3-glycidoxypropyl)triethoxysilane, (3-slycicoxypropyl)trimethoxysilane, [Hydroxyl(polyethylenoxy)propyl]triethoxysilane, N-(triethoxysiylpropyl)-opolyethylene oxide urethane, ureidopropyltriethoxysilane, 3-(triethoxysilyl)propylisocyanate, (Isocyanatomethyl)methyldimethoxysilane and 3-isocyanatopropyltrimethoxysilane may be used.

Details about the inorganic particle and the cross-linkable or hydrophilic functional group including at least one functional group selected from the group consisting of a (meth)acrylate-based functional group, an allyl group, a vinyl group, an epoxy group, a hydroxy group, an isocyanate group, and an amine group for modifying the surface thereof are the same as in the super absorbent polymer of one embodiment of the invention disclosed above.

Advantageous Effects

According to the present disclosure, the super absorbent polymer showing excellent characteristics such that various properties such as water retention capacity and absorption ability under pressure are improved together, unlike common sense that there is an inverse relationship between the water retention capacity and the absorption ability under pressure, and the preparation method thereof can be provided.

The super absorbent polymer of the present disclosure basically resolves the problems of existing super absorbent polymers and the technical requirements of the related art, and can show more improved properties, thereby suitably applied to various sanitary products.

DETAILED DESCRIPTION OF THE EMBODIMENTS

Hereinafter, the present invention will be described in more detail with reference to examples. However, these examples are for illustrative purposes only, and the invention is not intended to be limited by these examples.

Example 1

537.45 g of acrylic acid, 0.8 g (0.15 parts by weight based on 100 parts by weight of the monomer) of a porous zeolite containing a mesopore of Table 1, 0.86 g of polyethyleneglycol diacrylate (Mw=598) as a cross-linking agent, 653.17 g of 30% sodium hydroxide (NaOH), 0.04 g of 2,4,6-trimethyl-benzoyl-trimethyl phosphine oxide as an UV initiator, 1.07 g of sodium persulfate, and 206.41 g of water were mixed to prepare a monomer composition with the concentration of acrylic acid monomer of 36.7 wt % (the neutralization degree of acrylic acid: 70 mol %).

Thereafter, the monomer composition was stirred for 25 seconds at 300 rpm for foaming. Subsequently, the monomer composition was added through a feeder consisting of a movable conveyor belt of a polymerization reactor, irradiated with ultraviolet rays (irradiation amount: 2 mW/cm$^2$) using a UV irradiation device, and subjected to UV polymerization for 1 min and thermal polymerization for 2 min to prepare a hydrogel polymer. The hydrogel polymer was transferred to a cutter and cut to 0.2 cm. Here, the moisture content of the cut hydrogel polymer was 50 wt %.

Subsequently, the hydrogel polymer was dried with a hot air drier at 185° C. for 40 min, and the dried hydrogel polymer was pulverized with a pin mill pulverizer. And then, the polymer having a diameter less than about 150 μm and the polymer having a diameter of about 150 μm to 850 μm were classified by using a 38/1 sieve.

After proceeding up to the above classification, a base resin powder was obtained. Then, 0.67 g of 1,3-propanediol as a surface cross-linking agent was added to 2.8 g of water and 3.5 g of methanol, and mixed to prepare a surface cross-linking solution.

Thereafter, the surface cross-linking solution was sprayed on the prepared base resin powder, and stirred at room temperature so that the surface cross-linking solution was evenly distributed on the base resin powder. The base resin powder mixed with the cross-linking solution was then added into a surface cross-linking reactor, followed by surface cross-linking reaction. In this surface cross-linking reactor, the base resin powder was surface cross-linked at 185° C. for 90 min to prepare a super absorbent polymer of Example 1.

After the surface cross-linking reaction, a super absorbent polymer of Example 1 having a particle size of 150 μm to 850 μm was prepared by classifying with a standard mesh of ASTM standard.

Example 2

A super absorbent polymer having a particle size of 150 μm to 850 μm was prepared in the same manner as in Example 1 except that 2.68 g (0.5 parts by weight based on 100 parts by weight of the monomer) of the porous zeolite containing a mesopore as shown in Table 1 was used and the foaming time was changed to 22 seconds.

Comparative Example 1

A super absorbent polymer having a particle size of 150 μm to 850 μm was prepared in the same manner as in Example 1 except that 0.8 g of the porous zeolite containing a mesopore (the porosity of the mesopore is 0.2 or less as shown in Table 1) was used.

Comparative Example 2

A super absorbent polymer of Example 2 having a particle size of 150 μm to 850 μm was prepared in the same manner as in Example 1 except that the porous zeolite containing a mesopore was not used.

TABLE 1

| Porous zeolite | Total porosity (cm³/g) | Porosity of micropore (cm³/g) | Porosity of mesopore (cm³/g) | Specific surface area of entire pores (m²/g) | Specific surface area of other pores (m²/g) | Specific surface area of micropore (m²/g) | Specific surface area of mesopore (m²/g) |
|---|---|---|---|---|---|---|---|
| Example 1 | 0.7 | 0.3 | 0.3 | 822.6 | 129.6 | 671.4 | 134.6 |
| Example 2 | 0.9 | 0.2 | 0.6 | 650.6 | 165.9 | 484.7 | 133.9 |
| Comp. Example 1 | 0.37 | 0.25 | 0.12 | 697.0 | — | — | — |

Experimental Examples

The properties of the super absorbent polymers of Examples and Comparative Examples were evaluated according to the following methods, and the measured property values are shown in the following Table 1.

(1) Centrifuge Retention Capacity (CRC)

For the super absorbent polymers of Examples and Comparative Examples, the centrifuge retention capacity (CRC) by absorption ratio under a non-loading condition was measured according to the EDANA (European Disposables and Nonwovens Association) method WSP 241.2.

That is, after inserting $W_0$ (g, about 0.2 g) of each polymer obtained in Examples and Comparative Examples uniformly in a nonwoven fabric envelope and sealing the same, it was soaked in a 0.9 wt % saline solution at room temperature. After 30 min, it was dehydrated by using a centrifuge at 250 G for 3 min, and the weight $W_2$ (g) of each envelope was measured. Further, after carrying out the same operation without using the polymer, the weight $W_1$ (g) of each envelope was measured.

CRC (g/g) was calculated by using the obtained weight values according to the following Calculation Equation 1, and the water retention capacity was confirmed.

$$CRC(g/g)=\{[W_2(g)-W_1(g)]/W_0(g)\}-1 \qquad \text{[Calculation Equation 1]}$$

In Calculation Equation 1, $W_0(g)$ is an initial weight (g) of the super absorbent polymer, $W_1(g)$ is a weight of the apparatus measured after dehydrating the same by using a centrifuge at 250 G for 3 min without using the super absorbent polymer, and $W_2(g)$ is a weight of the apparatus with the superabsorbent polymer measured after soaking the super absorbent polymer in a 0.9 wt % saline solution for 30 min at room temperature and dehydrating the same by using a centrifuge at 250 G for 3 min.

(2) Absorbency Under Pressure (AUP)

For the super absorbent polymers of Examples and Comparative Examples, the absorbency under pressure (AUP) was measured according to the EDANA (European Disposables and Nonwovens Association) method WSP 242.3.

First, a 400 mesh stainless steel net was installed in a cylindrical bottom of a plastic having an internal diameter of 60 mm. $W_0$(g, 0.90 g) of the absorbent polymers prepared in Examples 1 to 6 and Comparative Examples 1 to 3 were uniformly scattered on the steel net under conditions of temperature of 23±2° C. and relative humidity of 45%, and a piston which can provide a load of 4.83 kPa (0.7 psi) uniformly was put thereon. The external diameter of the piston was slightly smaller than 60 mm, there was no gap between the cylindrical internal wall and the piston, and the jig-jog of the cylinder was not interrupted. At this time, the weight $W_3(g)$ of the device was measured.

After putting a glass filter having a diameter of 125 mm and a thickness of 5 mm in a Petri dish having a diameter of 150 mm, a physiological saline solution composed of 0.90 wt % of sodium chloride was poured in the dish until the surface level became equal to the upper surface of the glass filter. A sheet of filter paper having a diameter of 120 mm was put thereon. The measuring device was put on the filter paper and the solution was absorbed under a load for about 1 hour. After 1 hour, the weight $W_4(g)$ was measured after lifting the measuring device up.

AUP (g/g) was calculated by using the obtained weight values according to the following Calculation Equation 2, and the absorbency under pressure was confirmed.

$$AUP(g/g)=[W_4(g)-W_3(g)]/W_0(g) \qquad \text{[Calculation Equation 2]}$$

In Calculation Equation 2, $W_0(g)$ is an initial weight (g) of the super absorbent polymer, $W_3(g)$ is a sum of a weight of the super absorbent polymer and a weight of the apparatus providing a load to the polymer, and $W_4(g)$ is a sum of a weight of the super absorbent polymer and a weight of the apparatus providing a load to the polymer measured after making the super absorbent polymer absorb the saline solution for 1 h under a load (0.7 psi).

(3) BPI(Base Polymer Index) Measurement

For the super absorbent polymers of Examples and Comparative Examples, the centrifuge retention capacity (CRC, unit: g/g), the water-soluble component content (unit: wt %), and the absorbency under pressure of 0.7 psi (AUP, unit: g/g) were measured according to the EDANA method 441.2-02, 270.2, and 242.3, respectively. And then, the BPI was calculated according to the following Equation 1.

$$BPI = \frac{CRC + 8.7585}{\ln(\text{the water-soluble component content})} \qquad \text{[Equation 1]}$$

The properties of the super absorbent polymers of Examples and Comparative Examples measured by the above methods are listed in Table 2.

TABLE 2

| | AUP [unit: g/g] | Centrifuge Retention Capacity of the base resin without surface cross-linked layer (CRC) [unit: g/g] | Centrifuge Retention Capacity (CRC) [unit: g/g] | BPI |
|---|---|---|---|---|
| Example 1 | 25.7 | 52.7 | 38.8 | 18.9 |
| Example 2 | 22.5 | 54.3 | 41.1 | 19.3 |
| Comp. Example 1 | 18.5 | 51.1 | 40.7 | 18.1 |

TABLE 2-continued

| | AUP [unit: g/g] | Centrifuge Retention Capacity of the base resin without surface cross-linked layer (CRC) [unit: g/g] | Centrifuge Retention Capacity (CRC) [unit: g/g] | BPI |
|---|---|---|---|---|
| Comp. Example 2 | 20.6 | 49.3 | 35.6 | 18.0 |

As shown in Table 2, Comparative Example 1 showed an inverse relationship between the water retention capacity and the absorption ability under pressure, since it uses the porous zeolite in which a mesopore having a porosity of less than 0.2 is formed. However, the super absorbent polymers of Examples 1 and 2 showed the water retention capacity which was maintained almost as it was or rather increased, and more improved absorption performance compared with the Comparative Examples, in spite of the increase of the content of 'the porous zeolite in which a mesopore having a BET surface area of at least 100 m$^2$/g and a porosity of at least 0.2 cm$^3$/g is formed'. That is, it is confirmed that the super absorbent polymer exhibiting an excellent characteristics in which both of the water retention capacity and the absorption ability under pressure are improved together can be provided.

The invention claimed is:
1. A super absorbent polymer, comprising:
a base resin powder comprising a first cross-linked polymer of a water soluble ethylene-based unsaturated monomer containing acidic groups which are at least partially neutralized; and
a surface cross-linked layer comprising a second cross-linked polymer further cross-linked from the first cross-linked polymer and formed on the base resin powder,
wherein the first cross-linked polymer is bound to a porous zeolite in which a mesopore having a BET surface area of at least 100 m$^2$/g and a porosity of at least 0.2 cm$^3$/g is formed.
2. The super absorbent polymer of claim 1,
wherein the mesopore formed in the porous zeolite has a porosity of 0.2 cm$^3$/g to 0.8 cm$^3$/g, and a BET surface area of 100 m$^2$/g to 250 m$^2$/g.
3. The super absorbent polymer of claim 1,
wherein a total porosity of the porous zeolite is 0.5 cm$^3$/g to 1.0 cm$^3$/g, and
a BET surface area of entire pores formed in the porous zeolite is 500 m$^2$/g to 1500 m$^2$/g.
4. The super absorbent polymer of claim 1,
wherein the porous zeolite further comprises a micropore having a BET surface area of 300 to 900 m$^2$/g and a porosity of 0.1 to 0.5 cm$^3$/g.
5. The super absorbent polymer of claim 1,
wherein the soluble ethylene-based unsaturated monomer comprises at least one selected from the group consisting of: an anionic monomer of acrylic acid, methacrylic acid, maleic anhydride, fumalic acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and a salt thereof;
a nonionic hydrophilic monomer of (meth)acrylamide, N-substituted (meth)acrylate, 2-hydroxyethyl(meth)acrylate, 2-hydroxypropyl(meth)acrylate, methoxypolyethyleneglycol(meth)acrylate, or polyethyleneglycol(meth)acrylate; and
an amino-containing unsaturated monomer of (N,N)-dimethylaminoethyl(meth)acrylate or (N,N)-dimethylaminopropyl(meth)acrylamid, and a quaternary compound thereof.
6. The super absorbent polymer of claim 1,
wherein the first cross-linked polymer comprises a cross-linked polymer obtained by polymerizing the water soluble ethylene-based unsaturated monomer in the presence of an internal cross-linking agent including a polyfunctional acrylate-based compound containing a plurality of ethylene oxide groups.
7. The super absorbent polymer of claim 6,
wherein the internal cross-linking agent comprises at least one selected from the group consisting of polyethylene glycol diacrylate (PEGDA), glycerine diacrylate, glycerine triacrylate, unmodified or ethoxylated trimethylol triacrylate (TMPTA), hexanediol diacrylate, and triethylene glycol diacrylate.
8. The super absorbent polymer of claim 1,
further comprising an inorganic particle chemically bonded to the first cross-linked polymer by a medium of a cross-linking bond, an oxygen-containing bond (—O—), or a nitrogen-containing bond (—NR—; wherein R is hydrogen, a C1 to C3 alkyl group, or an amide bond).
9. The super absorbent polymer of claim 8,
wherein the inorganic particle is a silica nanoparticle, or an alumina nanoparticle surface-modified with a cross-linkable or hydrophilic functional group containing at least one functional group selected from the group consisting of a (meth)acrylate-based functional group, an allyl group, a vinyl group, an epoxy group, a hydroxyl group, an isocyanate group and an amine group.
10. The super absorbent polymer of claim 1,
wherein the second cross-linked polymer comprises a polymer that the first cross-linked polymer is further cross-linked by a surface cross-linking agent.
11. The super absorbent polymer of claim 10,
wherein the surface cross-linking agent comprises at least one selected from the group consisting of ethylene glycol, 1,4-butanediol, 1,6-hexanediol, propylene glycol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, glycerol, ethylene carbonate and propylene carbonate.
12. The super absorbent polymer of claim 1,
wherein the porous zeolite is included in an amount of 0.01 to 30 parts by weight based on 100 parts by weight of the base resin powder.
13. The super absorbent polymer of claim 1,
which has a particle diameter of 150 to 850 jim.
14. A method of preparing the super absorbent polymer of claim 1, comprising the steps of:
preparing a monomer neutralized solution by adding an internal cross-linking agent and a porous zeolite containing a mesopore having a BET surface area of at least 100 m$^2$/g and a porosity of at least 0.2 cm$^3$/g to a neutralized solution in which at least 20 mol % of a water soluble ethylene-based unsaturated monomer containing acidic groups is neutralized,
preparing a hydrogel polymer from the monomer neutralized solution by thermal polymerization or photopolymerization;
preparing a base resin powder by drying, pulverizing, and classifying the hydrogel polymer; and further cross-linking the surface of the base resin powder in the presence of a surface cross-linking agent to form a surface cross-linked layer.

15. The method of preparing the super absorbent polymer of claim 14,
further comprising a step of adding a basic compound to the water soluble ethylene-based unsaturated monomer containing acidic groups to form a neutralized solution which is at least 20 mol % neutralized.

16. The method of preparing the super absorbent polymer of claim 14,
wherein the monomer neutralized solution further comprises a thermal polymerization initiator or a photopolymerization initiator.

17. The method of preparing the super absorbent polymer of claim 14,
wherein the water soluble ethylene-based unsaturated compound is included in an amount of 20 to 60 wt % in the monomer neutralized solution.

18. The method of preparing the super absorbent polymer of claim 14,
wherein the mesopore formed in the porous zeolite has a porosity of 0.2 $cm^3/g$ to 0.8 $cm^3/g$, and a BET surface area of 100 $m^2/g$ to 250 $m^2/g$.

19. The method of preparing the super absorbent polymer of claim 14,
wherein a total porosity of the porous zeolite is 0.5 $cm^3/g$ to 1.0 $cm^3/g$, and a BET surface area of entire pores formed in the porous zeolite is 500 $m^2/g$ to 1500 $m^2/g$.

20. The method of preparing the super absorbent polymer of claim 14,
wherein the porous zeolite further comprises a micropore having a BET surface area of 300 to 900 $m^2/g$ and a porosity of 0.1 to 0.5 $cm^3/g$.

* * * * *